(12) United States Patent
Friesth

(10) Patent No.: US 7,758,300 B2
(45) Date of Patent: Jul. 20, 2010

(54) MULTI-TURBINE AIRFLOW AMPLIFYING GENERATOR

(75) Inventor: Kevin L. Friesth, Fort Dodge, IA (US)

(73) Assignee: Splitrock Capital, LLC, Brandon, SD (US)

( * ) Notice: Subject to any disclaimer, the term of this patent is extended or adjusted under 35 U.S.C. 154(b) by 464 days.

(21) Appl. No.: 11/315,711

(22) Filed: Dec. 22, 2005

(65) Prior Publication Data

US 2006/0138782 A1    Jun. 29, 2006

Related U.S. Application Data

(60) Provisional application No. 60/639,200, filed on Dec. 27, 2004.

(51) Int. Cl.
*F03D 1/02* (2006.01)
*F03D 1/04* (2006.01)

(52) U.S. Cl. .................. 415/4.3; 415/4.5; 415/58.5; 415/58.7; 415/60; 415/62; 415/67; 415/68; 415/144

(58) Field of Classification Search .......... 415/2.1, 415/4.3, 4.5, 60, 62, 67–69, 905, 908, 58.5, 415/58.7, 144, 145; 416/9–11, 117, 119, 416/120, 124, 125, 244 R, 244 A, DIG. 6; 290/43, 44, 54, 55
See application file for complete search history.

(56) References Cited

U.S. PATENT DOCUMENTS

| | | | | |
|---|---|---|---|---|
| 1,345,022 | A | * | 6/1920 | Oliver .................. 415/4.3 |
| 2,388,377 | A | * | 11/1945 | Albers .................. 290/55 |
| 3,339,078 | A | * | 8/1967 | Crompton ............... 290/44 |
| 3,944,839 | A | | 3/1976 | Carter |
| 4,075,500 | A | | 2/1978 | Oman et al. |

(Continued)

FOREIGN PATENT DOCUMENTS

WO    WO 94/25750    11/1994

(Continued)

OTHER PUBLICATIONS

Alfred L. Weisbrich, Mass Customatization of Warp Wind Power Plant Design & Construction, Copyright ENECO, 1997, Proceedings of the American Power Conference, vol. 59, 1997.

(Continued)

*Primary Examiner*—Christopher Verdier
(74) *Attorney, Agent, or Firm*—Dorsey & Whitney LLP; Brian J. Laurenzo

(57) ABSTRACT

The wind generating device employs modules each having two turbines. Each of the turbines employs two rotors, coaxially aligned and arranged one downstream from the other. The arrangement includes a proximal channel with a leading portion having decreasing radius toward the first rotor which acts as a collector and a following portion connecting fluidly the first and second rotor and a distal channel which is separate from the proximal channel and opens into the following portion thereby adding to the airflow to the second rotor. Downstream from the second rotor is a diffuser with radius increasing with distance from the rotor. The device includes mounting modules vertically stacked which allows for yaw responsive to wind. The device further includes mounting the modules on a tower.

36 Claims, 7 Drawing Sheets

U.S. PATENT DOCUMENTS

| | | | |
|---|---|---|---|
| 4,079,264 A | | 3/1978 | Cohen |
| 4,080,100 A | * | 3/1978 | McNeese .................... 416/189 |
| 4,134,707 A | | 1/1979 | Ewers |
| 4,184,084 A | | 1/1980 | Crehore |
| 4,204,799 A | * | 5/1980 | de Geus ...................... 415/4.5 |
| 4,516,907 A | * | 5/1985 | Edwards ..................... 415/4.5 |
| 4,550,259 A | | 10/1985 | Bertels |
| 4,781,522 A | * | 11/1988 | Wolfram ........................ 415/1 |
| 5,182,458 A | | 1/1993 | McConachy |
| 5,429,480 A | | 7/1995 | Van Der Veken |
| 5,464,320 A | * | 11/1995 | Finney ......................... 415/60 |
| 5,520,505 A | | 5/1996 | Weisbrich |
| 6,294,844 B1 | | 9/2001 | Lagerwey |
| 6,472,768 B1 | | 10/2002 | Salls |
| 6,674,181 B2 | | 1/2004 | Harbison |
| 6,749,399 B2 | | 6/2004 | Heronemus |
| 6,856,042 B1 | | 2/2005 | Kubota |
| 2003/0138315 A1 | | 7/2003 | Brueckner |
| 2003/0178855 A1 | | 9/2003 | Li |
| 2005/0074324 A1 | | 4/2005 | Yoo |

FOREIGN PATENT DOCUMENTS

| | | |
|---|---|---|
| WO | WO 2005/008062 A1 | 1/2005 |

OTHER PUBLICATIONS

Robert E. Duffy, Verif. Analysis of the Toroidal Accelerator Rotor Platform Wind Energy Conv. System, Rensselaer Polytechnic Institute, Sep. 1988.

Gilbert, et al., Fluid Dynamics of Diffuser-Augmented Wind Turbines, J. Energy, Nov.-Dec. 1978, vol. 2, No. 6, Grumman Aerospace Corp., Bethpage, NY.

E.A. Badr, R.F. Ghajar, School of Eng. and Architecture, Byblos, Lebanon, Power Augmentation of Wind Turbines; Experimental Study.

J.L. Loth, Wind Power Limitation Associated with Vortices, J. Energy, Jul.-Aug. 1978, vol. 2, No. 4.

Gilbert, et al., Experimental Demonstration of the Diffuser-Augmented Wind Turbine Concept, J. Energy, Jul.-Aug. 1979, vol. 3, No. 4, Grumman Aserospace Corp., Bethpage, NY.

Ozer Igra, Preliminary Results from the Shrouded Wind-Turbine Pilot Plant, J. Energy, Jul.-Aug. 1980, vol. 4, No. 4.

Phillips, et al., Aerodynamic analysis and monitoring of the Vortec 7 diffuser-augmented wind turbine, IPENZ Transactions, 1999, pp. 13-19, vol. 26, No. 1/EMCh.

Phillips, et al., Diffuser Development For A Diffuser Augmented Wind Turbine Using Computational Fluid Dynamics, Dept. of Mech. Eng. Univ. of Auckland, New Zealand.

* cited by examiner

ID OF BENEFIT OF PRIORITY

MULTI-TURBINE AIRFLOW AMPLIFYING GENERATOR

CLAIM OF BENEFIT OF PRIORITY

The benefit of priority is claimed based on the provisional application No. 60/639,200 filed Dec. 27, 2004 and titled "Multi-turbine Airflow Amplifying Generator".

BACKGROUND OF THE INVENTION

1. Field of the Invention

The present invention relates in general to wind generated power and, more precisely, to airflow wind channel capture and airflow acceleration for the purpose of generating power.

2. Description of the Prior Art

It is known in the art to use turbine rotors of assorted designs and configurations for providing a rotational inertia output in response to air flow. However, prior art turbines, particularly for wind energy transformation, are limited in their effectiveness by commonly available low speed wind power transformation.

Many wind turbines are of the windmill variety wherein a multi-blade rotor is mounted so that it spins around an axis generally horizontal to the ground. The blades are exposed directly to the wind and are not housed by any means. As wind passes over and under each blade, pressure differentials cause the blades to rotate about the axis. This rotation turns gears which produces power. The amount of power or energy produced by these horizontal rotors is dependent on many factors one of the most important of which is the area swept by the rotor or, in other words, the length of the blades. Therefore, in its most common form, a tower may accommodate only a single rotor and a generator. Even the most efficient of these allows some fifty plus percent of the wind to pass through. It should be noted that some flow must be maintained through the rotor in order to produce any power at all, however, current turbines are less efficient than is desirable. The formula for power derived from the wind includes the velocity cubed. Common windmills do not accelerate the wind to take advantage of this cubing effect.

Other related art turbines attempt to capitalize on the increased velocity factor by employing a collector which includes a radius larger than the rotor at the aft end that narrows to almost equal that of the rotor. The collector captures, focuses, and accelerates more wind toward the turbine than that which would pass through a bare rotor. A turbine and collector combination may result in reducing the necessary size of the rotor. The collector allows collection of a wider range of wind directions and can greatly reduce dependence on yaw capabilities. The effects of the angle or surface curvature at which the collector's radius decreases toward the rotor on wind speed at the rotor's center or outer tips has not been well defined or studied. In addition, because a reduction of static pressure at the rotor is necessary to accelerate the wind speed passing through (and resulting power) a collector alone will not increase the power produced.

Some related art turbines are positioned in a shroud behind which a diffuser extends. The diffuser's radius increases with the distance from the rotor. As wind passes through the rotor, negative pressure will be induced at the throat with pressure recovery as it progresses to the exit. The negative pressure draws in more air through the turbine which, in turn, results in a production of more power than a bare turbine of the same size.

The amount of wind drawn through a turbine as a result of a diffuser is affected by what is known as boundary layer separation. This phenomenon occurs near the inner surface of the diffuser where wind "separates from" or does not closely follow the inner surface thereby decreasing the theoretical power increase otherwise expected. Related art has addressed this inefficiency by employing additional momentum obtained from tangential injection of the free wind around the outside of the diffuser through inlet slots in the diffuser. More than a single slot may be indicated depending on size and angle of diffuser wall relative to horizontal. By adding slots to address boundary layer separation, the angle at which a diffuser's inner surface extends can be increased and a complementary reduction in length achieved thereby reducing the length required by earlier diffuser designs.

More recent related art combines a collector, shroud, and diffuser. In addition to augmenting the power over a bare turbine, this combination shortens the time for cut-in of the turbine thus converting energy at a lower wind speed.

The traditional school of thought includes the use of massive and very long rotors for which diffusers and collectors would be both expensive and heavy. Therefore, studies have been completed to test whether the power augmentation of a given diffuser configuration would be reduced if the trailing edge of the diffuser rested on or was near the ground. These studies revealed that when the ground plane was near the trailing edge, there appeared to be an augmentation of power and that there was no decrease in power. Further studies showed the velocity across the blade plane could be improved using a bullnose on the diffuser inlet and parabolic nose cone in front of the rotor hub.

None of the related art addressed the problems heretofore suffered by large turbines. For example, tower structure expense and size. The tower must be high to support the turbine and, due to the turbine's weight, the structure must be equally substantial as well as equipped to function against wind shear.

In addition, related art mostly employ single rotors that generate no power if the rotor fails. Finally, although efforts have been made to augment the power of a turbine, no efforts seem to have been made to actually use more of the wind mass passing the rotor blades.

More recently, related art has considered using a multiple of modules housing small rotors stacked vertically. These arrangements require less land area and provide redundancy such that the malfunction of one rotor does not shut down power generation. Specifically, this arrangement employs toroidal accelerator rotor platform systems which function by placing an obstruction in the path of the wind which causes the air to accelerate around it. A rotor is then placed in the region of highest local velocity. Using multiple such rotors substantially increases the system power output over rotors in free stream. The system uses the inner part of a toroid with a pair of rotors mounted in the semi-circular channel separated by 180 degrees so that both face the wind. Toroidal modules are then stacked upon one another. The rotors are free to yaw within the channel to face the wind.

The present invention differs from the above referenced inventions and others similar in that these prior devices typically employ one turbine per tower and depend on very large rotor swept areas. Although strides have been made to augment wind power using collectors and diffusers, even the modular types employing smaller rotors still allow over half of the wind (and its power) to pass through rotors unhindered and unharnessed.

One object of the present invention is to greatly enhance the power produced by a single tower by augmenting the power of each turbine and by utilizing more of the wind passing through the rotors;

A second object of the present invention is to provide a device that uses air channels to amplify airflow through the rotor along with associated collectors and diffusers;

A third object of the present invention is to provide a device wherein multiple rotors may be associated with one another to enhance efficiency;

A fourth object of the present invention is to reduce tower structure needs;

A fifth object of the present invention is to provide selective pitch control for rotors;

A sixth object of the present invention is to effectively capture and use wind power from any direction;

A seventh objective is to reduce the costs associated with wind power production by increasing the power produced per tower erected. This reduces land use and greatly increases the ratio of electricity generated to erected tower cost; and An eighth objection is to provide a wind power generative device that is more avian friendly by providing physical profiles detectable by birds and bats.

SUMMARY

The present invention provides an energy generating device comprising a tower structure and at least one—but preferably a plurality of—wind amplifying multi-turbine modules. In the preferred embodiment, two turbines are employed in each wind amplifying module and, while two said wind amplifying modules could be mounted side by side, the preferred embodiment employs generally vertical relativity. Each wind amplifying module of the preferred embodiment has a housing and two turbines. Each turbine comprises a minor outside opening fluidly connected to a proximal rotor and a proximal air channel, a major outside opening fluidly connected to a distal air channel and a distal rotor. The proximal rotor and the distal rotor are fluidly connected by the proximal air channel such that airflow to the distal rotor includes that which has passed through the proximal rotor in addition to that which has been collected by the distal air channel. The design of the proximal air channel near the minor opening includes a collector section having convex or concave sides into which wind enters and passes through the proximal rotor. The distal channel opens into the proximal channel behind the proximal rotor. This placement minimizes boundary layer separation while at the same time supplementing the wind mass and velocity passing through the distal rotor.

Each module also includes means for mounting each said module to the tower structure to allow generally horizontal yawing, a plurality of structural elements for support and strength, a gear box for each turbine, and a second gear box to combine power from multiple turbines. Means for mounting in the preferred embodiment comprise a stationary support associated with the tower structure, a support deck associated with each module, and both vertical and horizontal support rollers associated with the support deck. The rollers and the support deck are mounted on a bottom surface of the module housing. A yaw deck and additional vertical and horizontal support rollers are mounted on a top surface of the module housing. This arrangement provides a rotationally active interface between vertically stacked modules which allows the modules to yaw about a vertical axis of the tower while maintaining vertical placement. One modification uses a generally ring-like support deck such that a service hatch in the bottom surface of the housing may be accessed through the ring shaped support deck. The support deck may be integrally formed with the housing. The tower protrudes through an opening in the housing and through an opening in the stationary support.

The preferred embodiment of the energy generating device includes means for winching each module vertically along the height of the tower structure for assembly purposes and for maintenance purposes. Means for winching provided by the preferred embodiment comprises a winch and crane arm at the top of the tower structure. The energy generating device further comprises at least one, but preferably a single generator. It should be understood that additional rotor-wind channel-gear box groups could be employed in a single module and that many modules may be combined in a single energy generating device of the present invention.

For each turbine, the minor outside opening comprises a radius larger than and decreasing along the proximal air channel to approximately equal the proximal rotor such that air flow through said rotor is amplified both in mass and velocity. The major opening is fluidly connected with said distal rotor through said distal air channel and separated from said minor opening. A diffuser having a radius gradually increasing with distance from the second rotor creates negative pressure at the rotors and amplifies the wind speed and mass through the proximal rotor and the distal rotor. Wind energy from each turbine is converted to mechanical energy through the gear box associated with that turbine and, in the preferred embodiment, mechanical energy from both turbines is transferred to a second gearbox and then to a single generator. Power is transported from the generator out and down the tower structure through successive yaw collars which are equipped with electrical contacts in continuous contact even as the module swings about the vertical axis of the tower. This arrangement provides a lighter, smaller, less expensive energy generating device. It should be understood that a single generator may, in fact, receive mechanical energy from more than two turbines or multiple modules.

Independent pitch control means are provided for each said rotor for maximizing efficiency. Mechanics known in the art including a motor are linked to the blades to change the angle of attack or pitch on each blade. This change alters the amount of wind affected by the rotor. Functionally this allows the turbine to maximize possible power production. Control of this change can be either manual or automated. The manual system would be adjustable only when rotational inertia was paused. An automated system would be controlled by an algorithm receiving signals from various sensors monitoring physical characteristics of wind flow and also mechanical characteristics of the rotor assembly. The automated system would use an iterative process based on the algorithm to adjust pitch and maximize power. The automated system would allow pitch to be modified when rotational inertia is present.

Structural elements employed in the module comprise a variety of shapes, sizes and arrangements which are dictated by the conditions and capacity of the energy generating device with which the module will be associated. The conditions include the total number of modules, expected wind velocities, number of turbines within the module, the height of this particular module relative to the ground and its placement relative to other modules. The plurality of structural elements in the preferred embodiment are uniformly spaced ribs both axially and concentrically oriented relative to the air channels relative to the axis of the rotors. However, it is contemplated that said elements could also comprise a webbed structure, ribs of various lengths and depths, positioned either internal or external to the wind channel or housing, or other similar devices.

The present invention provides an energy generating device modular in nature. Modules may be mounted together in any fashion deemed structurally safe. Modules are outfitted with electrical generating hardware optimally sized for the wind resources available at the location the modules are to be erected. Groups of modules may include but are not limited to configurations ranging from 1 to 60 modules mounted together in a fashion to generate between 50 kilowatts and 15 megawatts. The number of such energy generating devices that can be located on a given space of suitably characterized ground varies as numbers may increase or decrease with suitability. Compared to other energy generating devices utilizing wind power, the present invention is projected to provide increased power output for less cost than currently accepted industry averages.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DESCRIPTION OF THE PREFERRED EMBODIMENT(S)

Figure 1:
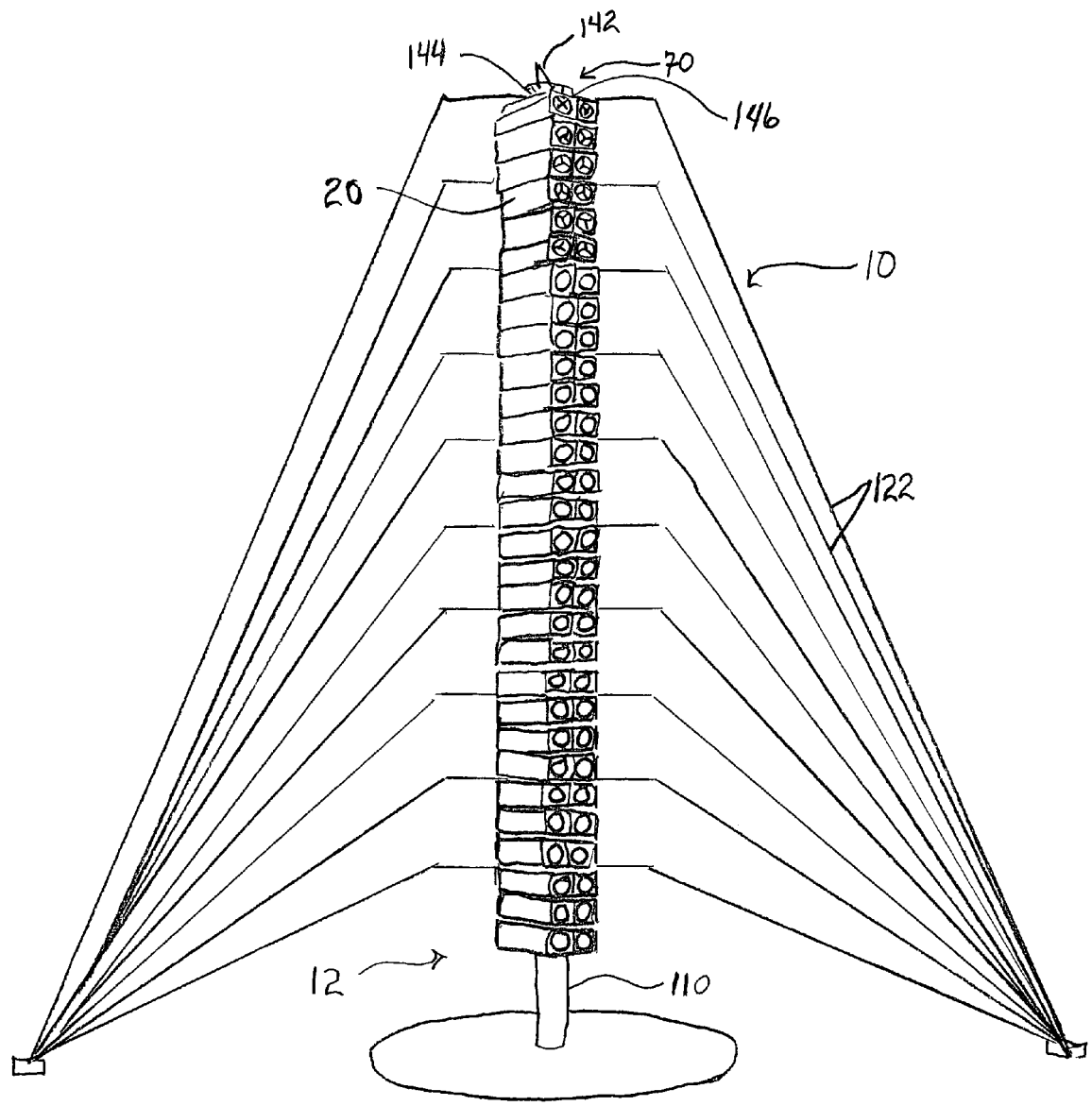
FIG. 1 is a perspective view of an energy generating device of the present invention.
Figure 2:
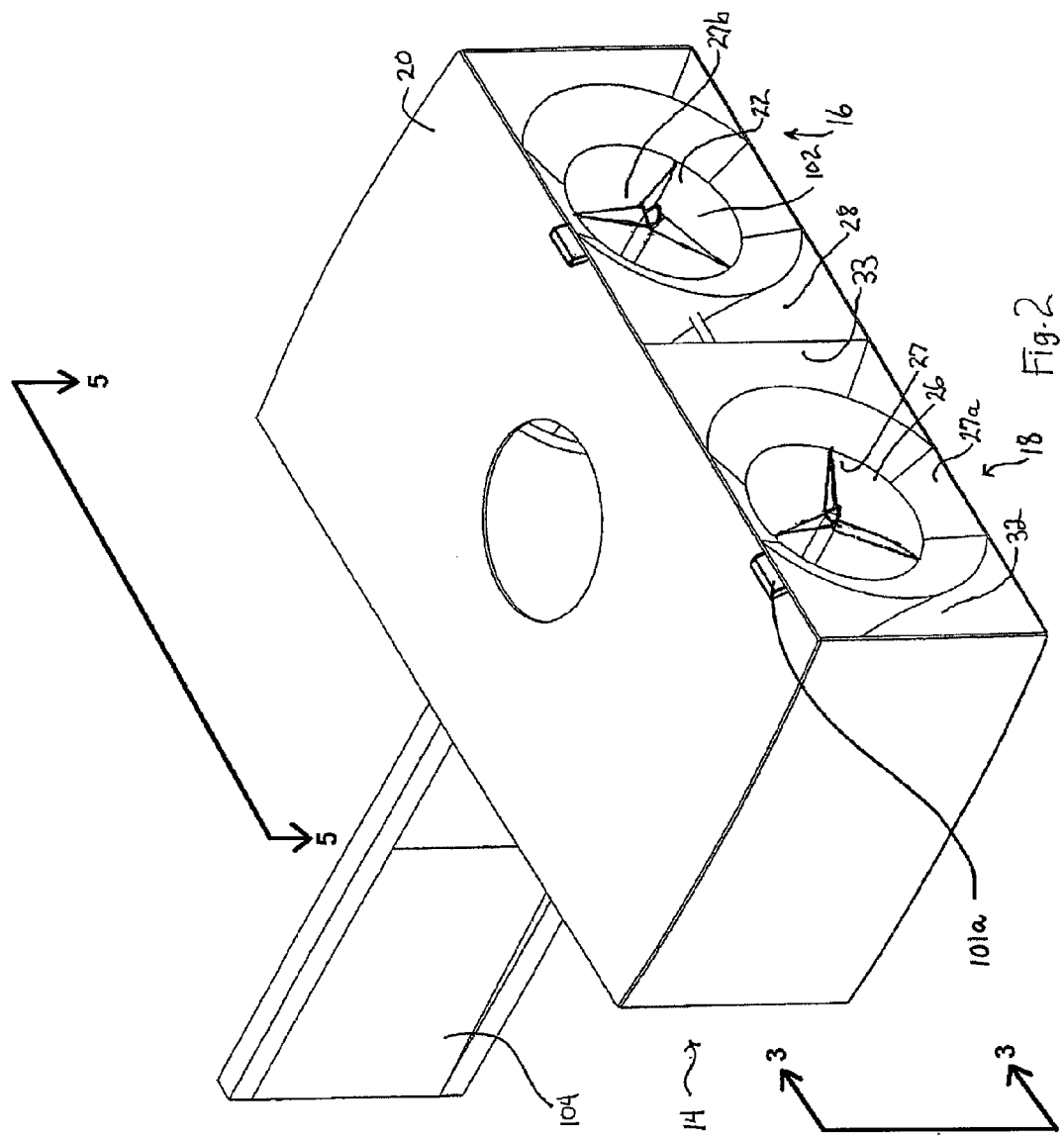
FIG. 2 is a perspective of a wind amplifying module of a preferred embodiment of the present invention.
Figure 3:
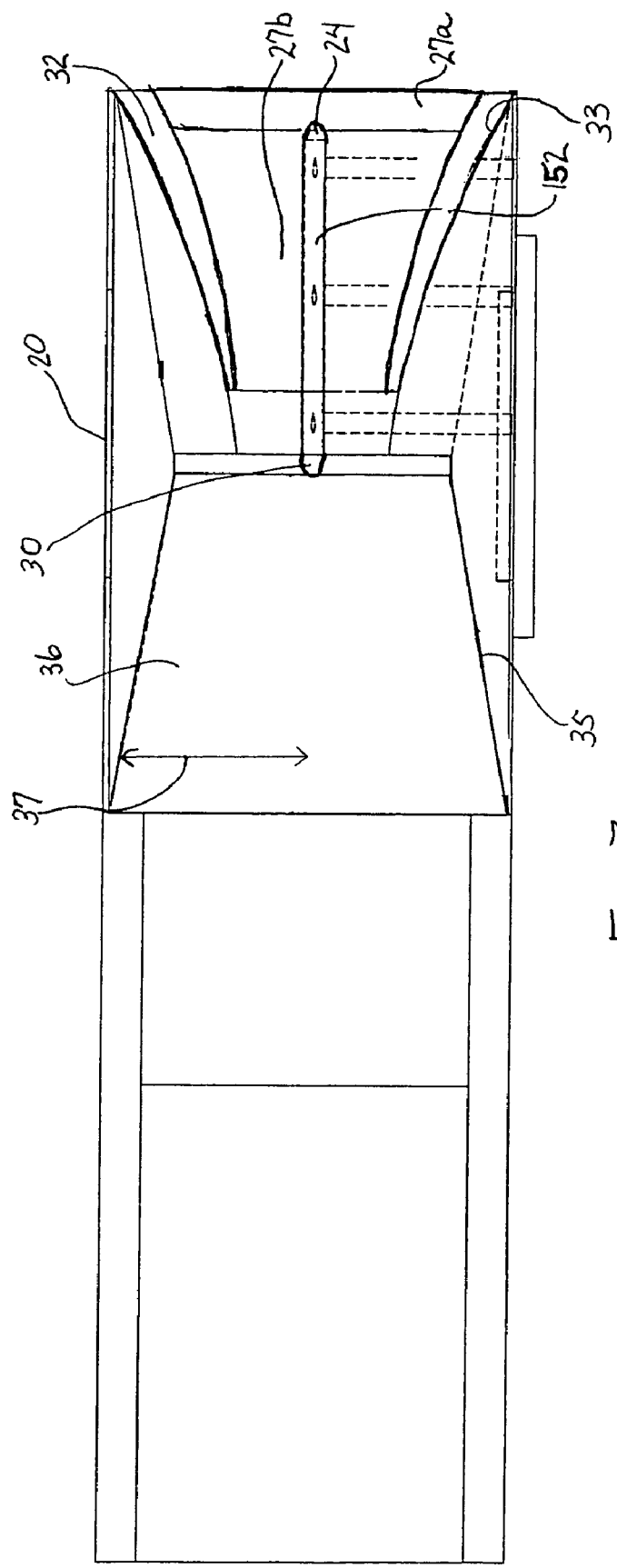
FIG. 3 is a perspective view of a cross section of FIG. 2 along line 3-3.
Figure 4:
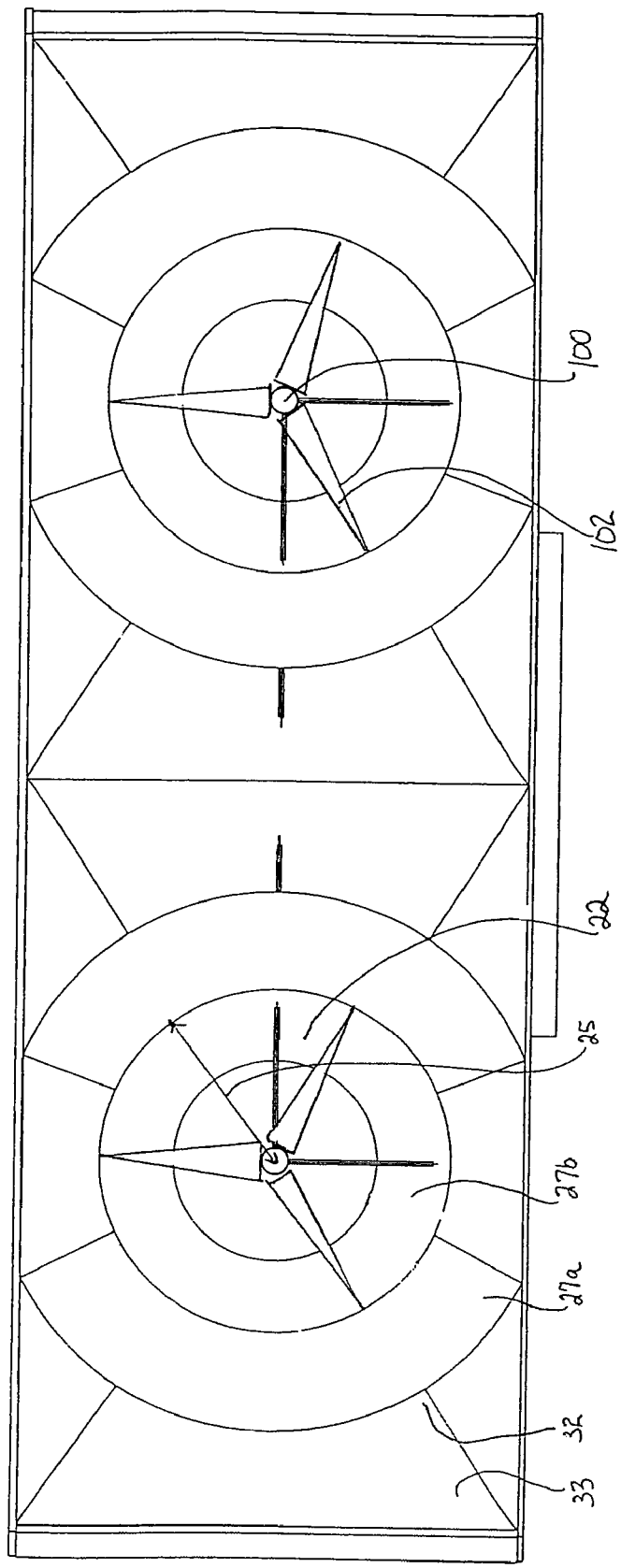
FIG. 4 is a front end view of the wind amplifying module of FIG. 2.
Figure 5:
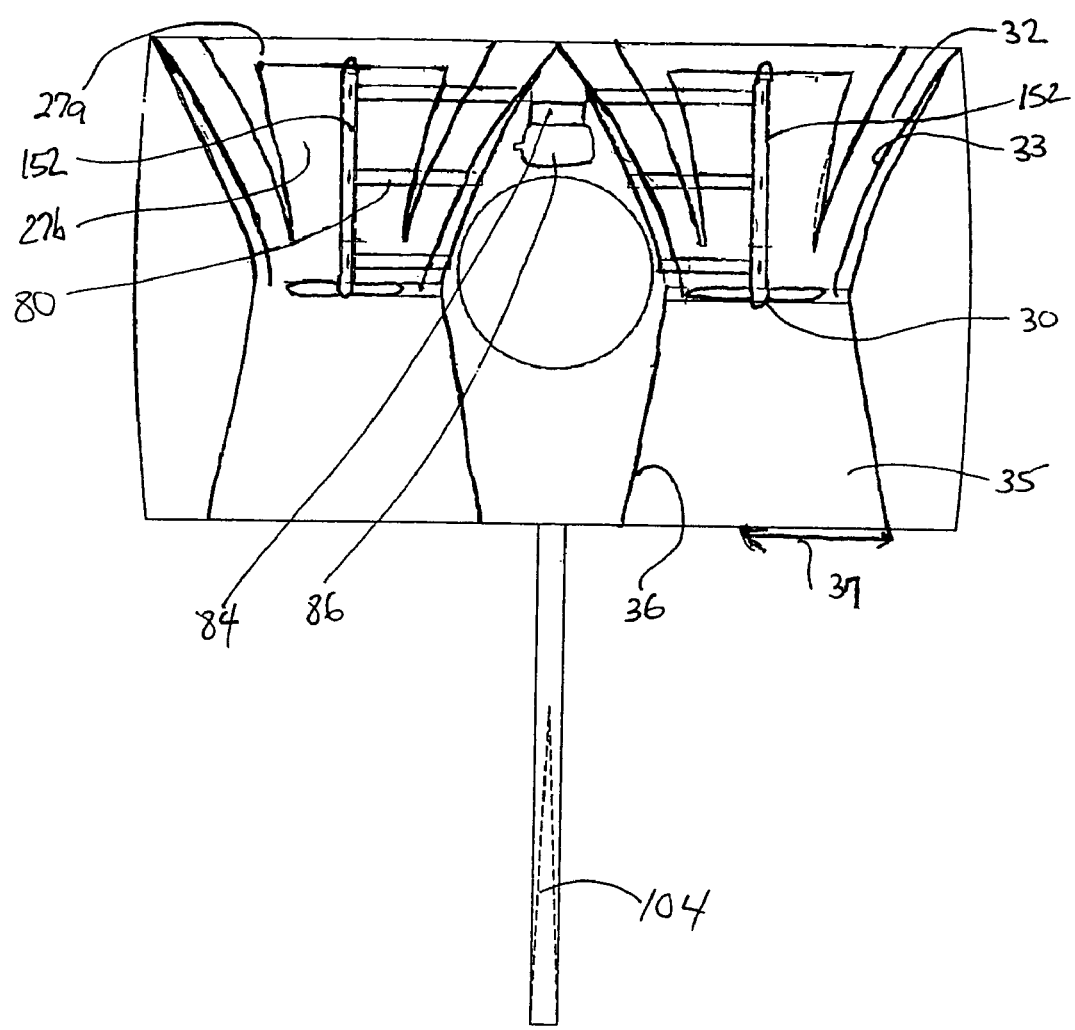
FIG. 5 is a plan view of a cross section of FIG. 2 along line 5-5 showing drive shafts, supports, gear boxes and generator.
Figure 6:
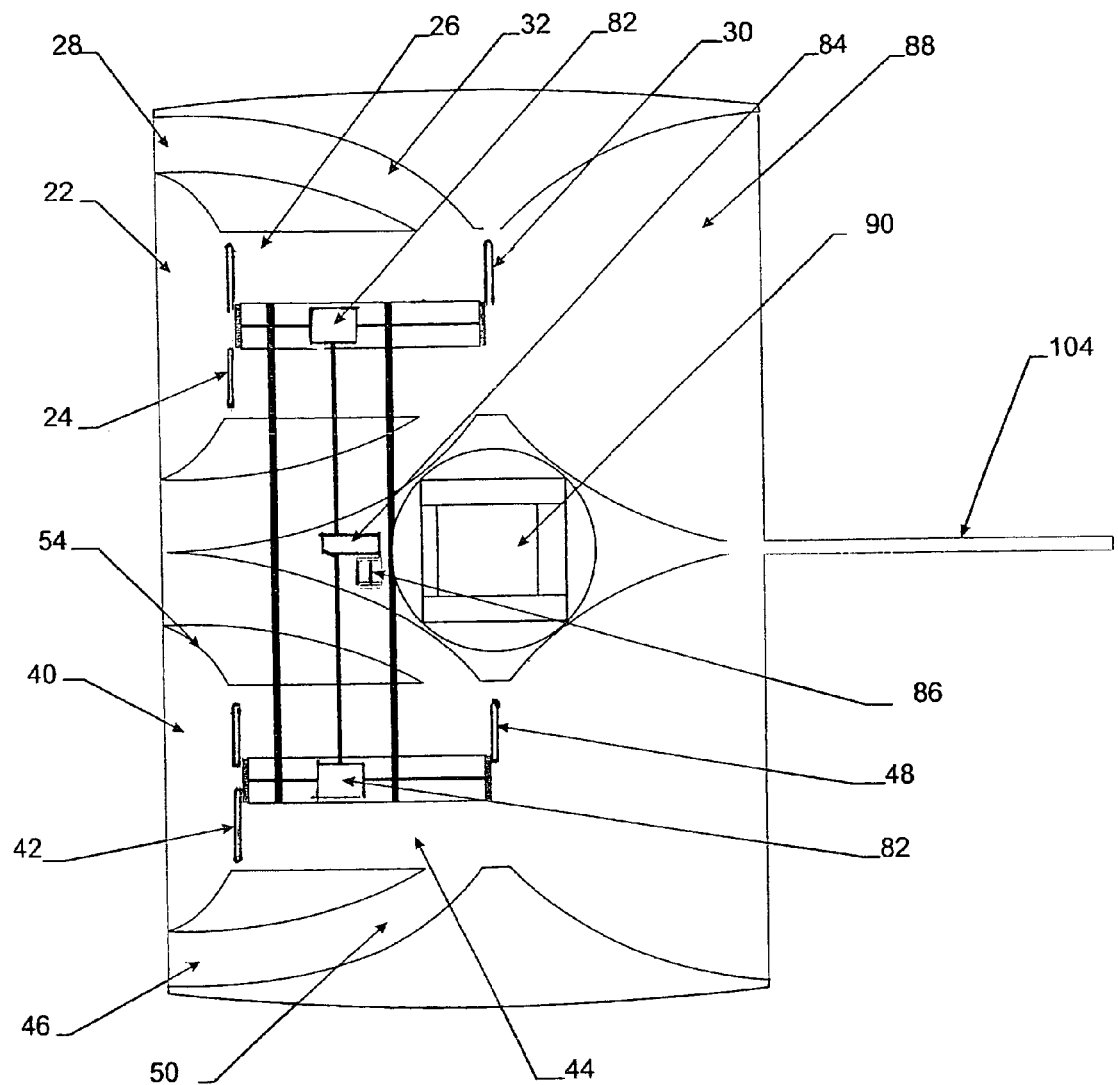
FIG. 6 is a bottom plan view of a single module of the present invention showing the detail of means for mounting the module of the preferred embodiment.
Figure 7:
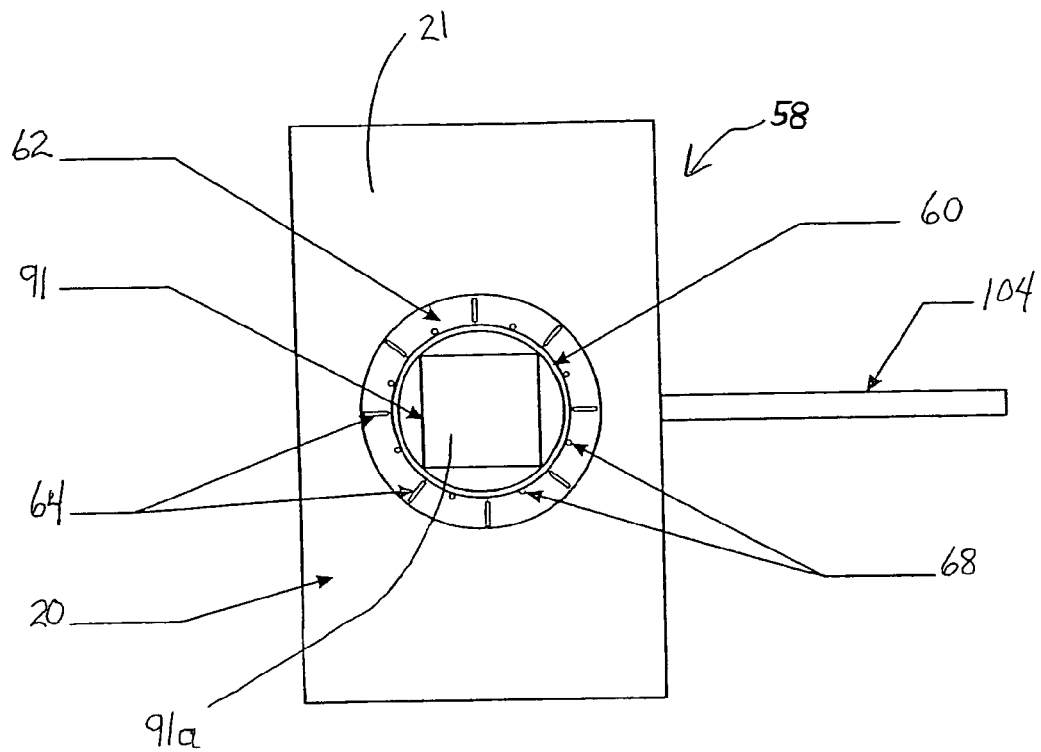
FIG. 7 is a close up of the bottom plan view shown in FIG. 6 showing the detail of means for mounting the module of the preferred embodiment.
Figure 8:
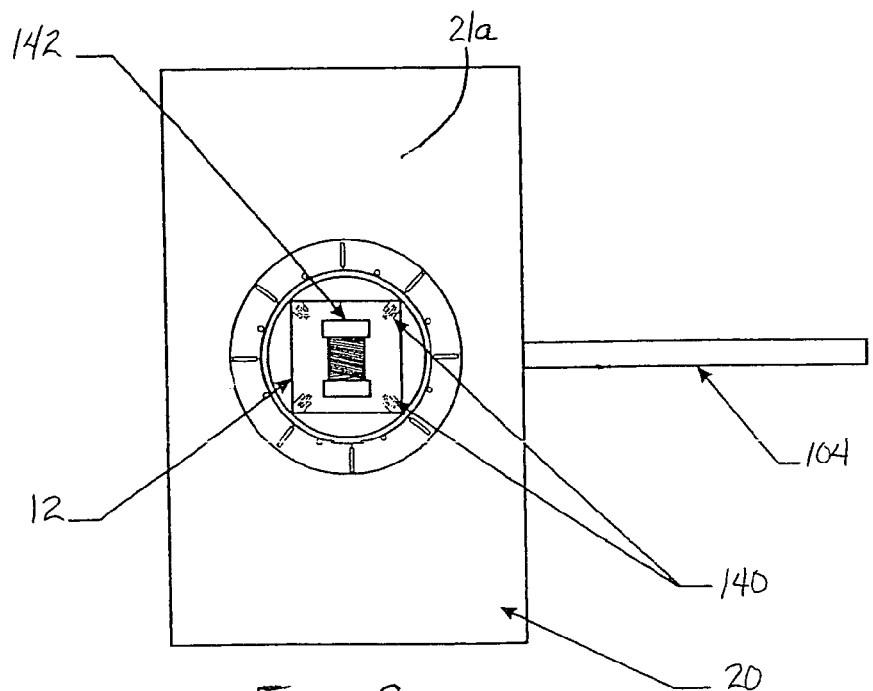
FIG. 8 is a top plan view of a single module of the present invention showing detail.

The energy generating device of the present invention is shown generally as 10 in FIG. 1. The energy generating device 10 comprises a tower structure 12 and at least one but preferably a plurality of wind amplifying multi-turbine modules 14 each having at least one turbine 16 or 18. In the preferred embodiment shown in FIGS. 2 and 3, a first turbine 16 and a second turbine 18 is employed in each wind amplifying module. Each wind amplifying module of the preferred embodiment further comprises a housing 20, and said first turbine 16 comprises a proximal channel opening 22, a first proximal rotor 24 having a first radius 25, a first proximal air channel 26 having an inner surface 27 and a leading portion 27a and a following portion 27b, a distal channel opening 28, a first distal rotor 30 having a second sweep, and a first distal air channel 32 having a surface 33. A diffuser 35 having an inner surface 36 and an expanding radius 37 is positioned just behind said first distal rotor. The second turbine 18 comprises a second proximal channel opening 40, a second proximal rotor 42, a second proximal air channel 44, a second distal channel opening 46, a second distal rotor 48, and a second distal air channel 50.

For each turbine 16 and 18, said proximal rotor 24, 42 respectively, and said distal rotor 30, 48 respectively are in fluid communication such that airflow into said distal rotor 30 includes that which has passed through said proximal rotor 24 in addition to that which has passed through said distal air channel 32. Said proximal rotor 24, 42 is preferably substantially centered in said proximal opening 22, 40. In the preferred embodiment, means for sequentially associating said rotors 152 is provided and comprises an external drive shaft. The module also includes means for mounting each said module 58 allowing generally horizontal yawing, a plurality of structural elements for support and strength 80, a gear box 82 and an internal gear box 84. Said energy generating device further comprises at least one but preferably a single generator 86. It should be understood that additional turbine-wind channel-gear box groups could be employed in a single module and that many modules may be combined in a single energy generator of the present invention.

For each said turbine 16 and 18, the proximal channel 26 comprises the leading portion 27a having a radius larger than and tapering toward the proximal rotor. The following portion 27b comprises a radius nearly equal said proximal rotor 24 such that air flow through said rotor 24 is directed to said distal rotor 30. The surface 27 may be convex or concave; when convex or concave to the inside, the surface 27 acts as an object in the path of the wind and creates a higher local velocity and wind mass at the proximate rotor. Depending on the turbine's size, it may be advantageous to employ slight convexity or slight concavity to the inner surface 27 of the proximal channel 26. Where such inner surface 27 is convex toward the air channel, air flow can be moved closer to the center of the rotor thereby countering outflow otherwise expected.

The distal channel opening 28, is fluidly connected with said distal rotor 30 through said distal air channel 32 and separated therefore from said proximal channel opening 22. Following and fluidly connected to both said proximal rotor 24 and said distal rotor 30 is the diffuser 35. The inner surface 36 of said diffuser angles outwardly such that it has an expanding radius 37. The diffuser creates a negative pressure behind the distal rotor 30 which draws air through both rotors at higher mass and velocity.

Finally, the distal air channel 32 opens into the following portion 27b of the proximal channel 26 thereby adding tangential velocity to the air flow into the distal rotor 30 increasing the power generated as well as addressing and managing boundary layer separation otherwise expected at the inner surface 36 of the diffuser 35.

In a preferred embodiment, said means for sequentially associating said proximal and distal rotors further comprises said following portion 27b of proximal air channel 26, 44 respectively wherein air flow passes through the following portion 27b to said distal rotor 30 and is combined with air flow through the distal channel. In a preferred embodiment, the following portion tapers toward the distal rotor and may comprise a radius less than that of the distal rotor thereby focusing the airflow toward the middle of the distal rotor to avoid outflow.

Wind energy from each turbine 16, 18 is converted to mechanical energy through the gear box 82 associated with that turbine and, in the preferred embodiment, mechanical energy from both turbines is transferred to an internal gearbox 84 and then to a single generator 86. This arrangement provides a lighter, smaller, less expensive energy generating device. It should be understood that a single generator may, in fact, receive mechanical energy from more than two turbines.

Independent pitch control means 100 are provided for each said rotor 24, 30, 42, 48 for maximizing efficiency. Each said rotor 24, 30, 42, 48 comprises a plurality of blades 102. Said means 100 include a motor (not shown) associated with each blade 102 in each said rotor 24, 30, 42, 48. Independent pitch control means 100 are controlled either manually through switching mechanisms or automatically in response to changes in wind speeds and directions. Balance of each module 14 relative to the wind direction is achieved via the placement of the outside openings 22, 28, 40, 46 for each turbine and a rudder 104 opposite. In other embodiments, balance may be achieved by manual or other means. Automation of the pitch control of the blades 102 is accomplished by employing a computer and at least one sensor 101a. The computer applies an algorithm in response to signals from said sensors indicating changes in wind flow or mechanical characteristics of the rotors. Using an iterative process, the computer provides commands to the motor (not shown) associated with each rotor 24, 30, 42, 48 to effect the pitch of each blade 102 thereby maximizing power output.

Said plurality of structural elements 80 for support and strength comprises a variety of shapes, sizes and arrangements which are dictated by the conditions and capacity of the energy generating device upon which the module will be mounted. The conditions include the total number of modules, expected wind velocities, number of turbines within the module, the height of this particular module relative to the ground and its placement relative to other modules. The plurality of structural elements in the preferred embodiment are uniformly spaced ribs 80 both axially and concentrically oriented relative to the air channels and to the axis of the rotor. However, it is contemplated that said elements could also comprise a webbed structure, ribs of various lengths and depths, either internal or external to the air channel or housing, or other similar devices.

Said means for mounting 58 the module to said tower structure 12 to allow generally horizontal yawing in the preferred embodiment comprises a stationary support 110 associated with said tower structure 12. The stationary support 110 is further secured by anchored guy wires 122. A support deck 62 is associated with each said module 14. A plurality of vertical support rollers 68 and a plurality of horizontal support rollers 64 are associated with said support deck 62. The rollers 68 and 64 and the support deck 62 are positioned on a surface 21 of the module housing 20. A yaw deck 91 and an additional plurality of vertical support rollers 68 and an additional plurality of horizontal rollers 64 are mounted on an opposite surface 21a of said housing 20. This arrangement provides a rotationally active interface between vertically stacked modules 14 which allows the modules to yaw about a vertical axis of the tower 12 while maintaining vertical placement. One modification uses a generally ring-like support deck 62 such that the tower structure 12 protrudes through an opening 91a in said module and some elements of said module can be accessed through a service hatch 90 in the bottom surface 21 of the housing 20. The support deck 62 may be integrally formed with the housing.

The preferred embodiment of the present invention includes means for winching 70 said modules 14 along the tower structure 12. Said means 70 comprises a winching mechanism 142 and a crane arm at least one support guide 140 and a plurality of cables 144. The winching mechanism is mounted on a top portion 146 of said tower structure 12 and said cables 144 are wound on said winch 142. Said at least one support guide 140 are associated with said module such that during assembly or for maintenance, said cables are further removably attached to said cable guides and the winch is activated, raising the module along the tower structure. Once vertically positioned as desired, the yaw deck of one module is electrically associated with the support deck of the module vertically adjacent to it. This association provides the necessary power transfer through the yaw deck down the tower and allows independent horizontal yawing.

Thus, the present invention has been described in an illustrative manner. It is to be understood that the terminology that has been used is intended to be in the nature of words of description rather than of limitation.

Many modifications and variations of the present invention are possible in light of the above teachings.

What is claimed is:

1. An energy generative device for harnessing airflow comprising:
   a) a wind amplifying module;
   b) a tower structure in communication with said wind amplifying module;
   c) said wind amplifying module comprises a housing in which is positioned at least one turbine,
   d) each said at least one turbine comprises a proximal rotor having a first radius, a distal rotor having a second radius, a distal channel comprising an outer bounding surface defined by a portion of said housing, and a proximal channel received within said distal channel arranged such that airflow to said distal rotor includes that which has passed through said proximal channel and said proximal rotor and air flow provided by said distal channel;
   e) each said turbine further comprises said proximal rotor and said distal rotor generally coaxially spaced apart one from another.

2. The energy generative device as claimed in claim 1 further comprising a diffuser positioned in fluid communication with the distal rotor to accommodate air passing therethrough.

3. The energy generating device of claim 2 further comprising:
   a) means for mounting said at least one module onto said tower;
   b) a plurality of structural elements to support and strengthen said energy generating device; and
   c) a gear box for transferring energy from each said at least one turbine.

4. The energy generative device as claimed in claim 3 wherein said proximal channel comprises a proximal opening in which said proximal rotor is substantially centered and an inner surface having a leading portion comprising a radius larger than said first radius of the proximal rotor, said leading portion acting as a collector.

5. The energy generative device as claimed in claim 3 wherein said distal channel comprises a distal channel opening in which said proximal channel is positioned to conduct airflow to said distal rotor, and said distal rotor positioned relative to said distal channel to receive airflow from said distal channel.

6. The energy generative device as claimed in claim 5 wherein said proximal channel further comprises a following portion in fluid communication with said distal rotor and said distal channel.

7. The energy generating device of claim 3 wherein said means for mounting said module onto said tower allows for horizontal yawing of said module.

8. The energy generating device of claim 7 wherein said means for mounting comprises:

a) a stationary support associated with said tower structure;
b) a support deck associated with a first surface of said housing;
c) a yaw deck associated with an opposite surface of said housing;
d) a plurality of vertical and horizontal support rollers positioned on said support deck and a second plurality of vertical and horizontal support rollers positioned on said yaw deck to provide a rotationally active interface between vertically stacked modules.

9. The energy generating device of claim 8 wherein said support deck comprises a generally ring shape and said module defines an aperture such that said tower structure protrudes through said module support deck.

10. The energy generating device of claim 2 further comprising a plurality of uniformly spaced ribs axially and concentrically oriented with respect to the axis of said proximal and said distal rotors.

11. The energy generative device as claimed in claim 1 wherein said proximal channel comprises a proximal opening in which said proximal rotor is substantially centered and an inner surface having a leading portion comprising a radius larger than said first radius of the proximal rotor acting as a collector and a following portion in fluid communication with said distal rotor.

12. The energy generative device as claimed in claim 11 wherein the distal rotor is axially aligned with said proximal rotor and said proximal channel, and said distal rotor positioned relative to said distal channel to receive airflow from said distal channel.

13. The energy generative device as claimed in claim 11 wherein each said at least one turbine further comprises a diffuser positioned in fluid communication with the distal rotor to accommodate air passing through said distal rotor.

14. The energy generative device as claimed in claim 13 wherein said diffuser comprises an inner surface with a radius expanding with distance from said distal rotor.

15. The energy generating device of claim 14 wherein said device further comprises at least one generator and a gear box for transferring energy from each said at least one turbine to said generator.

16. The energy generating device of claim 11 wherein said device includes a plurality of said modules.

17. The energy generating device of claim 11 wherein said proximal rotor further comprises a plurality of blades and means for controlling the pitch of said plurality of blades.

18. The energy generating device of claim 1 wherein said at least one turbine includes a first turbine and a second turbine, said module further includes a rudder positioned between two said turbines and associated with the housing to provide balance and wind orientation.

19. The energy generative device as claimed in claim 1 further comprising means to associate said proximal rotor and said distal rotor.

20. The energy generating device as claimed in claim 1 further comprising a drive shaft to associate said proximal rotor and said distal rotor.

21. An energy generative device for harnessing airflow comprising;
a) at least one turbine;
b) each said at least one turbine comprising a proximal rotor, a distal rotor, and a means to associate in general coaxial alignment said proximal rotor and said distal rotor spaced apart one from the other;
c) a proximal channel comprising an inner surface, an outer surface, and a following portion having a radius decreasing toward said distal rotor for guiding airflow first to said proximal rotor and then said distal rotor; and
d) a distal channel having an outer bounding surface and an inner surface formed by said outer surface of said proximal channel for guiding airflow to said distal rotor.

22. The energy generative device as claimed in claim 21 further comprising a diffuser positioned in fluid communication with the distal rotor to accommodate air passing through said distal rotor.

23. The energy generative device of claim 21 wherein said proximal channel further comprises a leading portion separated from said following portion generally at the proximal rotor and said distal channel opens into said following portion.

24. The energy generative device of claim 23 wherein said leading portion comprises a radius larger than the first radius of the proximal rotor and acts as a collector and said following portion comprises a radius tapering toward said distal rotor.

25. The energy generative device of claim 24 wherein each said at least one turbine further comprises a diffuser in fluid communication with the distal rotor having an inner surface with a radius expanding with distance from said distal rotor.

26. An energy generative device for harnessing airflow comprising at least one turbine having:
a) a leading edge for receiving airflow;
b) a proximal rotor positioned upstream from and generally coaxially aligned with a distal rotor;
c) a proximal channel originating at said leading edge of said at least one turbine, said proximal channel to guide airflow having a leading portion upstream from said proximal rotor, and a following portion downstream from said proximal rotor and diminishing in radius toward and upstream from said distal rotor; and
d) a distal channel originating at said leading edge of said at least one turbine, said distal channel comprising an outer bounding surface.

27. The energy generative device of claim 26 further comprising a diffuser downstream of said distal rotor and having a radius expanding with distance from said distal rotor.

28. The energy generative device of claim 27 wherein said distal channel opens into said following portion downstream from said proximal rotor and upstream from said distal rotor.

29. An energy generative device for harnessing airflow comprising:
a) at least one turbine;
b) each said at least one turbine comprising a proximal rotor, a distal rotor, and means for generally coaxially aligning and associating said proximal rotor and said distal rotor spaced apart one from the other;
c) a distal channel;
d) a proximal channel received within said distal channel, said proximal channel comprising an inner surface for guiding airflow first to said proximal rotor and then said distal rotor, a leading portion and a following portion separated generally at the proximal rotor, said following portion comprising a radius diminishing toward said distal rotor;
e) said distal channel guiding airflow to said distal rotor wherein said distal channel opens into said following portion of said proximal channel and comprises an outer bounding surface; and
f) a diffuser positioned in fluid communication with the distal rotor to accommodate air passing through said distal rotor.

30. An energy generative device for harnessing airflow comprising:

a) at least one turbine and a housing therefore;
b) each said at least one turbine comprising a proximal rotor positioned upstream from a distal rotor in spaced apart, coaxial alignment;
c) a distal channel having comprising an outer bounding surface formed by a portion of said housing for guiding airflow to said distal rotor;
d) a proximal channel, a portion of which is received within said distal channel, said proximal channel having a following portion comprising a radius decreasing with distance to said distal rotor; and
e) a diffuser positioned in fluid communication with the distal rotor.

31. The energy generative device claimed in claim 30 further comprising a proximal channel having a leading portion upstream from said proximal rotor and said following portion downstream from said proximal rotor and upstream from said distal rotor.

32. The energy generative device claimed in claim 31 wherein said distal channel opens into said following portion.

33. The energy generative device claimed in claim 32 wherein said distal channel comprises a distal channel opening in which said proximal channel is positioned to conduct airflow to said distal rotor.

34. The energy generating device of claim 31 wherein said proximal channel further comprises a surface exhibiting convexity relative to the proximal channel.

35. The energy generating device of claim 30 wherein each said proximal rotor further comprises a plurality of blades and means for controlling the pitch of said plurality of blades.

36. The energy generating device of claim 35 wherein said means for controlling the pitch includes at least one sensor associated with said housing.

* * * * *